United States Patent [19]

Wajda

[11] Patent Number: 5,430,880
[45] Date of Patent: Jul. 4, 1995

[54] APPARATUS AND METHOD FOR CONTROLLING THE TIME ASSIGNMENT OF THE PROCESSING POWER OF A DATA PROCESSING SYSTEM

[75] Inventor: Wieslawa Wajda, Keltern-Dtl., Germany

[73] Assignee: Alcatel N.V., Amsterdam, Netherlands

[21] Appl. No.: 584,731

[22] Filed: Sep. 19, 1990

[30] Foreign Application Priority Data

Sep. 25, 1989 [DE] Germany ............... 39 31 924.5

[51] Int. Cl.$^6$ ................... G06F 9/00; G06F 13/00
[52] U.S. Cl. ................... 395/750; 395/375; 364/DIG. 1
[58] Field of Search ........... 395/750, 375; 364/200, 364/900, DIG. 1; 365/226, 229

[56] References Cited

U.S. PATENT DOCUMENTS

| | | | |
|---|---|---|---|
| Re. 31,736 | 11/1984 | Mueller et al. | 364/900 |
| 4,051,326 | 9/1977 | Badagnani et al. | 395/750 |
| 4,145,735 | 3/1979 | Soga | 364/200 |
| 4,145,739 | 3/1979 | Dunning et al. | 364/200 |
| 4,152,761 | 5/1979 | Louie | 364/DIG. 1 |
| 4,220,990 | 9/1980 | Alles | 364/200 |
| 4,389,706 | 6/1983 | Gomola et al. | 364/DIG. 1 |
| 4,425,616 | 1/1984 | Woodell | 364/200 |
| 4,631,659 | 12/1986 | Hayn, II et al. | 364/200 |
| 4,639,916 | 1/1987 | Boutterin et al. | 364/200 |
| 4,642,758 | 2/1987 | Teng | 364/200 |
| 4,669,059 | 3/1987 | Little et al. | 395/750 |
| 4,718,007 | 1/1988 | Yukino | 395/750 |
| 4,747,041 | 5/1988 | Engel et al. | 395/750 |
| 4,782,441 | 3/1988 | Inagami et al. | 364/DIG. 1 |
| 4,796,178 | 1/1989 | Jennings et al. | 364/200 |
| 4,809,163 | 2/1989 | Hirosawa et al. | 395/750 |
| 4,821,187 | 4/1989 | Ueda et al. | 395/375 |
| 4,972,312 | 11/1990 | den Doef | 395/725 |
| 5,111,465 | 5/1992 | Edem et al. | 364/DIG. 2 |
| 5,115,509 | 3/1992 | Kahler | 364/DIG. 2 |
| 5,129,078 | 7/1992 | Groves et al. | 364/DIG. 2 |
| 5,193,189 | 3/1993 | Flood et al. | 364/DIG. 2 |

FOREIGN PATENT DOCUMENTS

2611907 3/1975 Germany.
2801517 1/1977 Germany.

OTHER PUBLICATIONS

Russell et al, "The Gray-1 Computer System", Communications of the ACM, vol. 21, No. 1, Jan. 1978, pp. 63–72.

Männer et al, "Design and Realization of the Fast, Flexible and Fault-Tolerant Polyprocessor 'Heidelberg Polyp'", Elektronische Rechenanlagen, book 3, Jan. 24, 1982, pp. 157–174.

"Studies in Operating Systems", R. M. McKeag et al, Academic Press, London, 1976, pp. 86–87 and 205–209.

*Primary Examiner*—Allen R. MacDonald
*Assistant Examiner*—George Davis
*Attorney, Agent, or Firm*—Ware, Fressola, Van Der Sluys & Adolphson

[57] ABSTRACT

An optimum utilization of the processing power of a data processing system is made possible by information marking a special processing state assigned to those jobs that can be arbitrarily shifted in the time axis. These jobs are performed by the system after activation by a user's input and until such time as a new user's input is carried out.

15 Claims, 1 Drawing Sheet

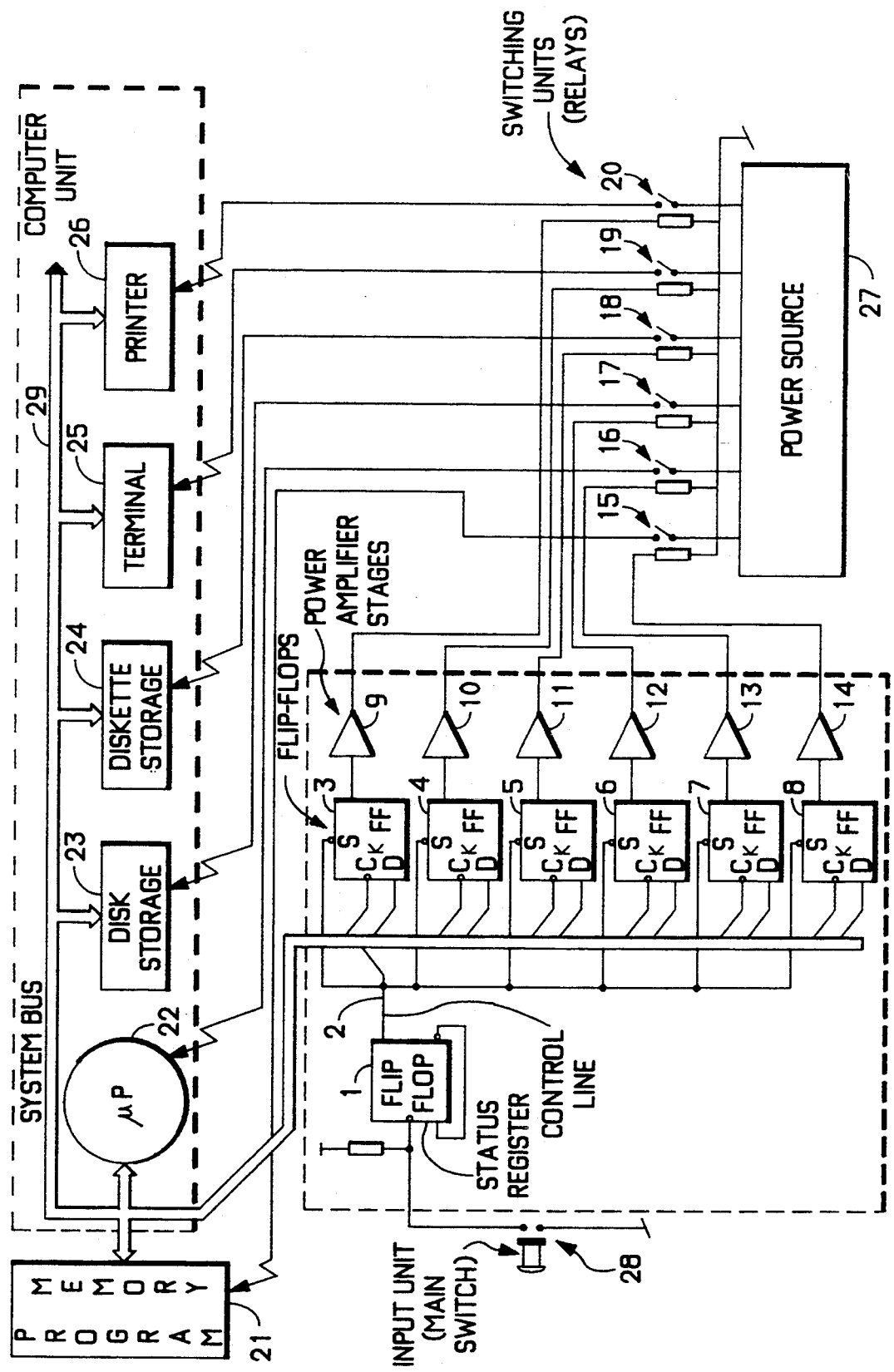

APPARATUS AND METHOD FOR CONTROLLING THE TIME ASSIGNMENT OF THE PROCESSING POWER OF A DATA PROCESSING SYSTEM

BACKGROUND OF THE INVENTION

1. Field of the Invention

The present invention relates to a method and apparatus for controlling the time assignment of the processing power of a data processing system for optimum utilization of the system, and more particularly to a data processing sytem incorporating such an apparatus.

2. Description of the Prior Art

Data processing systems using several microprocessors are already known. In such systems, each microprocessor processes a job or a part of the jobs to be processed. The distribution of the jobs to the processors is controlled by operating programs of the data processing systems in accordance with presettable priorities ("Design and Realization of the Rapid, Flexible and Error-Tolerant Heidelberger POLYP Polyprocessor" by R. Männer, W. Saaler, T. Sauer and P. von Walter, *Elektronische Rechenanlagen*, Vol. 24, No. 4 [1982]).

It is also known to use expensive high-speed components in order to achieve the highest possible processing power ("The Cray 1 Computer System", R. M. Russel, *CACM*, Vol. 21, pp. 63–70, [January 1987]).

SUMMARY OF THE INVENTION

An objective of the invention is to provide a process for controlling of the time assignment of the processing power of a data processing system for the optimum distribution of jobs to the system.

A further objective is to provide a data processing system suitable for carrying out this process.

The present invention contemplates a method wherein a specific processing state is assigned to those jobs which can be arbitrarily shifted in time and wherein to handle such jobs, the data processing system can be activated by a user input to perform jobs having the specific processing state until a new user input occurs.

A data processing system for carrying out the method includes a program memory and a computer unit which are interconnected by a system bus, and a status register connected to an input unit and to the system bus and serving to activate or deactivate the computer unit for executing specifically marked jobs.

The advantages achievable by means of the invention consist particularly in that it is possible to be able to decide between jobs whose execution is absolutely necessary immediately, or whose processing can be carried out at an arbitrary later time, when the data processing system is not in great demand. For this, in a special processing state of the data processing system, which can be activated, for example, by an operator by the input of an instruction or by starting an algorithm evaluating the workload of the data processing system or by the activation of the main switch of the power supply, such time-shiftable jobs are processed until a new input takes place.

Thus, the data processing system has a greater processing power available for the processing of urgent jobs, since less urgent jobs are deferred to quiet periods. An exemplifying embodiment will be explained below with reference to the drawing.

DESCRIPTION OF THE DRAWING

The drawing shows a block diagram of a data processing system according to the invention.

DETAILED DESCRIPTION OF THE PREFERRED EMBODIMENT

A data processing system, as shown in the figure, contains a program memory 21, a computer unit, consisting of a microprocessor 22, disk storage 23, diskette storage 24, and a system bus 29 connecting the above-mentioned parts. A terminal 25 including a conventional keyboard and video display unit and a printer 26 are also connected with the system bus 29.

According to the invention, an input unit 28, in this case a main switch 28 for the power supply of the data processing system, is connected with a status register 1, in this case a D flip-flop. The status register 1 is connected via a control line 2 with the system bus 29 and with power supply units for the program memory 21, the processor 22, disk storage 23 and diskette storage 24, the terminal 25 and the printer 26. A power supply unit includes a control path, i.e., a D flip-flop 3, 4, 5, 6, 7 or 8, whose set input S is connected with the control line 2 and whose data input D is connected with the system bus 29. The outputs of the D flip-flops 3, 4, 5, 6, 7 and 8 are connected via power amplifier stages 9, 10, 11, 12, 13 and 14, respectively, with switching units 15, 16, 17, 18, 19 and 20 of the power supply unit. The switching units connect or disconnect a power source 27 from the program memory 21, the microprocessor 22, the disk storage 23, the diskette storage 24, the terminal 25 and the printer 26. In this process, it is possible to connect or disconnect each previously-mentioned part of the data processing system in itself from the power source. The switching units 15, 16, 17, 18, 19, 20 are made up of relays.

In the operating program, the programs to be processed, and parts of the process data are stored in the program memory 21 of the data processing system. The microprocessor 22 carries out the programs stored in the program memory 21. The disk storage 23 and the diskette storage 24 serve as external bulk storage units for additional programs and data.

To explain the process according to the invention, it is assumed that the status register 1 is always supplied with power.

To control the time assignment of processing power of the data processing system for the optimal distribution of jobs in the time axis, all those jobs which can be arbitrarily shifted in time are assigned and marked with a specific processing state. Such jobs are, for example, the updating or optimization of the management of data bases. It also includes the processing of extremely time-consuming jobs, which are separated out of the direct program flow in which the computer results are produced, and which are managed as independent jobs in the data processing system.

In normal operation, the power supply of the data processing system is first switched on by the activation of the main switch 28 by a user. The input "activation of the main switch" results in the status register 1 taking on the status "FALSE", as a result of which, controlled by the control line 2, the power supply unit 27 supplies all parts of the data processing system with power for normal operation. In normal operation, all jobs that are not specially marked and absolutely necessary computer operations are processed.

When the user has had his urgent jobs processed, it is signalled by activation of the main switch 28 of the data processing system that its processing power is no longer needed for the moment.

With the activation of the main switch 28, the status register 1 changes over to the "TRUE" status. This results in an interrupt request to the microprocessor 22. The latter checks the status of the status register 1 and, on the basis of the existing status "TRUE", only those jobs showing a special marking are now processed under the control of the operating program. This processing can thus be carried out preferably during such periods when the user is not present for extended periods, such as, for example, at night, on holidays and Sundays.

During the processing of these jobs, under the control of the microprocessor 22, all parts of the data processing system that are not required, such as the terminal 25 and printer 26, can be separated via the power supply units.

If a new input is carried out by the user, i.e., an activation of the main switch 28, then the status register 1 again takes on the status "FALSE", as a result of which there is again a switchover to normal operation via an interrupt request to the processor. At the same time, all parts of the data processing system are switched on via the power supply units.

In this way, jobs adjusted to the individual requirements of a user can be arbitrarily shifted in time in order to achieve the optimum possible utilization of the data processing system.

Instead of the activation of the main switch by the user, it is, of course, also possible to carry out any arbitrarily presettable input via the terminal.

What is claimed is:

1. A method for controlling a time assignment of processing power of a data processing system having both prioritized jobs and jobs which can be arbitrarily shifted in time stored to be executed for an optimum distribution of jobs on a time axis, comprising the steps of:
   storing information indicative of said jobs which can be arbitrarily shifted in time; and
   activating, in response to a user input at an arbitrary time, the data processing system to execute said jobs which can be arbitrarily shifted in time, and in response to a new user input, assigning the processing power of the data processing system for executing the prioritized jobs.

2. A method as claimed in claim 1, wherein said step of activating occurs in response to said user input at an arbitrary time of entering an instruction.

3. A method as claimed in claim 2, wherein in response to said user input at an arbitrary time only said jobs which can be arbitrarily shifted in time are executed under control of an operating program of the data processing system.

4. A method as claimed in claim 3, wherein during execution of said jobs which can be arbitrarily shifted in time, all parts of the data processing system which are not needed for execution are deactivated under control of the operating program.

5. A method as claimed in claim 1, wherein said step of activating occurs in response to said user input at an arbitrary time of starting an algorithm for evaluating a workload of the data processing system.

6. A method as claimed in claim 5, wherein in response to said user input at an arbitrary time only said jobs which can be arbitrarily shifted in time are executed under control of an operating program of the data processing system.

7. A method as claimed in claim 6, wherein during execution of said jobs which can be arbitrarily shifted in time, all parts of the data processing system which are not needed for execution are deactivated under control of the operating program.

8. A method as claimed in claim 1, wherein said step of activating occurs in response to said user input as an arbitrary time of operating a main switch of a power supply for the data processing system.

9. A method as claimed in claim 8, wherein in response to said user input at an arbitrary time only said jobs which can be arbitrarily shifted in time are executed under control of an operating program of the data processing system.

10. A method as claimed in claim 9, wherein during execution of said jobs which can be arbitrarily shifted in time, all parts of the data processing system which are not needed for execution are deactivated under control of the operating program.

11. A method as claimed in claim 1, wherein in response to said user input at an arbitrary time only said jobs which can be arbitrarily shifted in time are executed under control of an operating program of the data processing system.

12. A method as claimed in claim 11, wherein during execution of said jobs which can be arbitrarily shifted in time, all parts of the data processing system which are not needed for execution are deactivated under control of the operating program.

13. A data processing system, comprising:
   a program memory;
   a computer unit;
   a system bus interconnecting the program memory and the computer unit;
   a status register having an output connected to the system bus by a control line; and
   an input unit connected to the status register, said status register output being activated in response to a user input to said input unit at an arbitrary time, said status register output being deactivated in response to a new user input to said input unit, the computer unit being responsive to said status register output being activated for executing jobs which can be arbitrarily shifted in time, the computer units being responsive to said status register output being deactivated for executing prioritized jobs.

14. A data processing system as claimed in claim 13, wherein the input unit is a master switch for a power supply of the data processing system.

15. A data processing system as claimed in claim 13, wherein the status register is connected via a control line to power supply units for the program memory and the computer unit.

* * * * *